Figure 1:
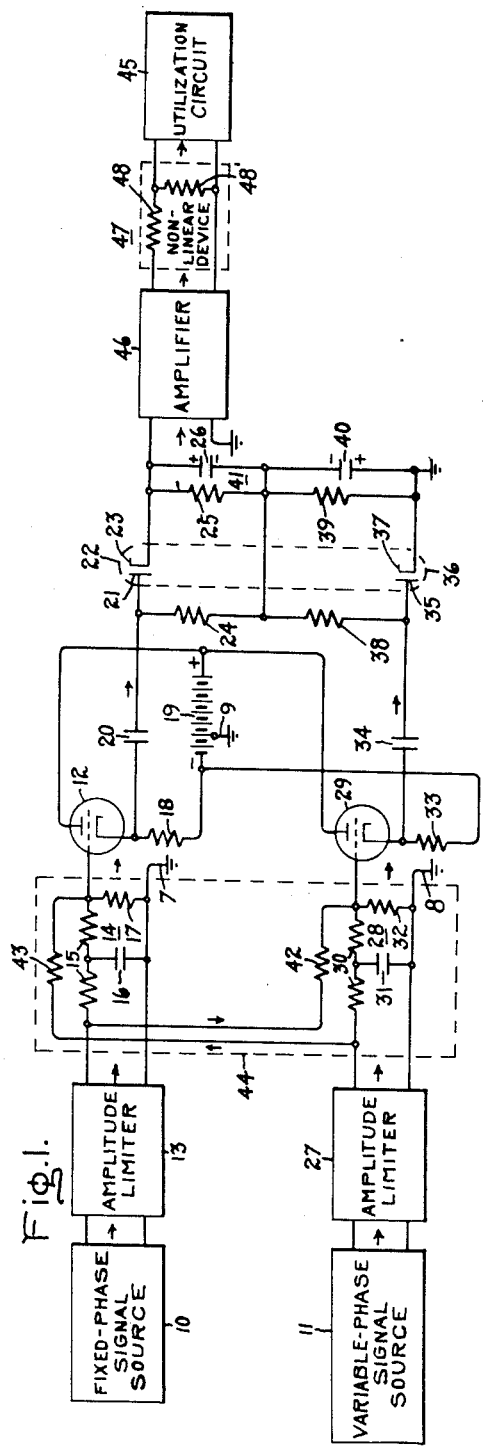

June 19, 1956 — G. M. KIRKPATRICK — 2,751,555
EXTENDED-RANGE PHASE COMPARATOR
Filed Oct. 3, 1951 — 2 Sheets-Sheet 1

Inventor:
George M. Kirkpatrick,
by Merton D Moore
His Attorney.

June 19, 1956  G. M. KIRKPATRICK  2,751,555
EXTENDED-RANGE PHASE COMPARATOR
Filed Oct. 3, 1951  2 Sheets-Sheet 2
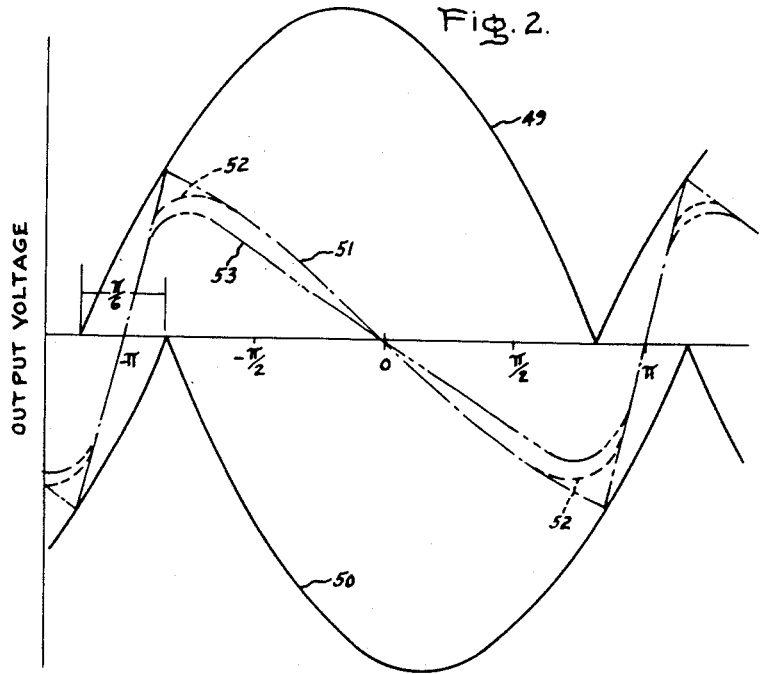
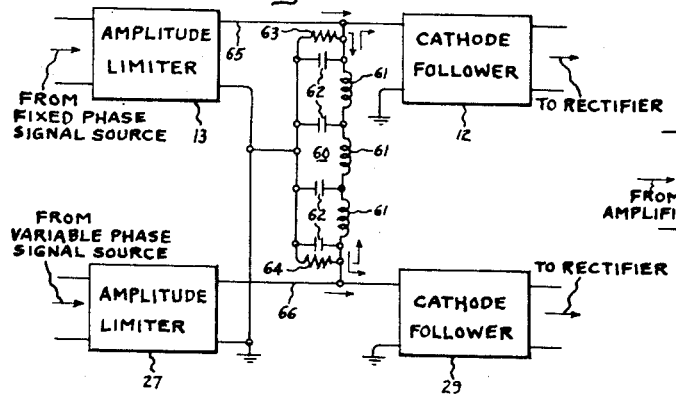
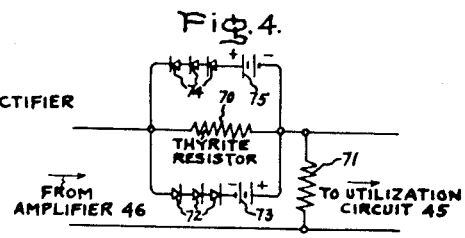
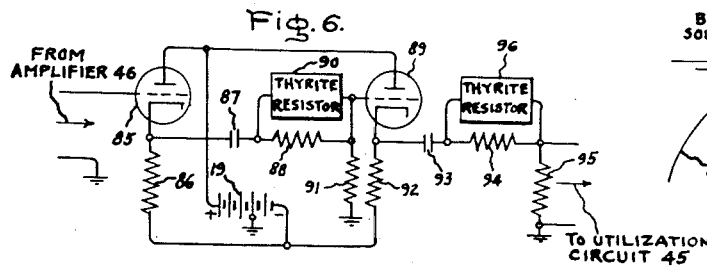
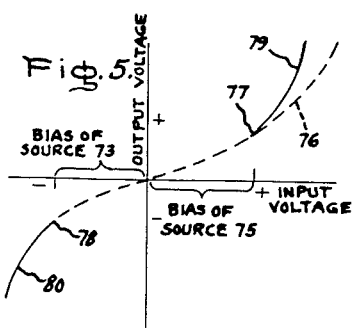
Inventor:
George M. Kirkpatrick,
by Merton D. Moore
His Attorney.

United States Patent Office 2,751,555
Patented June 19, 1956

2,751,555

EXTENDED-RANGE PHASE COMPARATOR

George M. Kirkpatrick, Syracuse, N. Y., assignor to General Electric Company, a corporation of New York Application October 3, 1951, Serial No. 249,581

13 Claims. (Cl. 324—89)

This invention relates to an improved phase comparator and, more particularly, to such a comparator operable over a wide range of phase displacement.

The invention further relates to that type of phase comparator in which the two voltages to be compared in phase are each supplied to two rectifiers with a predetermined, fixed phase displacement, and it has for its object to effect certain improvements with respect to the operating range of phase variation that may be accurately compared or determined.

Another object of the present invention is to provide an improved phase comparator operable over a range of phase displacement greater than heretofore possible.

Yet another object of the invention is to provide an improved phase comparator that is responsive to phase displacements between two applied signal voltages, extending beyond a range of plus and minus $\pi/2$ radians, and yet which exhibits a substantially linear phase displacement versus output signal amplitude characteristic throughout its entire operating range. A corollary object of the present invention is to provide novel linearizing means for a phase comparator.

Briefly stated, a phase comparator in accordance with the present invention comprises a phasing network coupling a source of a pair of signal voltages, having the same frequency and subject to variations in phase relative to one another, to a pair of rectifiers. Means are included in the phasing network for introducing a fixed phase displacement of less than $\pi/2$ radians at the operating frequency of the comparator between the signal voltages as applied to each of the rectifiers. The comparator further includes an output circuit for combining the rectified components of the signal voltages applied to the rectifiers to derive an output voltage having instantaneous amplitude values corresponding to the variations in phase between the incoming signals, and a utilization circuit is coupled to the output circuit. Linearizing means is included in the signal translating path comprising the source of signals, the phasing network, the rectifiers, the output circuit and the utilization circuit.

In a specific embodiment of the invention, the phasing network includes a pair of individual phase-delay networks, and each of the input signal voltages is applied to one of the dectectors through one of the phase-delay networks. In addition, translating paths are provided for applying each signal voltage directly to the rectifier to which the other signal voltage is supplied in delayed form.

Another embodiment of the invention comprises a pair of coupling circuits for supplying each incoming signal voltage to one of the rectifiers without phase delay, and a single, phase-delay network is coupled between these coupling circuits so that the signal voltages as applied to each rectifier are displaced in phase by a fixed amount less than $\pi/2$ radians at the operating frequency of the comparator.

In accordance with an additional feature of the invention, linearizing means for the phase comparator comprises a pair of paralleled elements having individual, different, non-linear applied voltage versus resulting current characteristics. Biasing means are provided in connection with one of these elements so that they are sequentially operative with increasing amplitudes of the applied signal voltage.

Another embodiment of this feature of the invention comprises a pair of elements that individually exhibit non-linear applied voltage versus resulting current characteristics. Means are provided for coupling these elements in cascade relation.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

Fig. 1 is a schematic diagram, partly in block form, of a phase comparator constructed in accordance with the present invention; Fig. 2 is a graph representing certain operating characteristics of the circuit of Fig. 1; Figs. 3, 4 and 6 are respective circuit diagrams of various modifications of the circuit of Fig. 1; and Fig. 5 is a graph representing operating characteristics of the circuit of Fig. 4.

Referring now to Fig. 1 of the drawing, there is shown a phase comparator embodying the present invention for deriving an output signal corresponding to the instantaneous phase displacement between the signals or electromotive forces from a signal source of fixed phase 10 and a signal source of variable phase 11, these signals being of the same frequency. Source 10 is coupled to the input circuit of a cathode-follower tube 12 through an amplitude limiter 13 and a phase-delay network 14 which includes a pair of series resistors 15 and a condenser 16 connected in a T arrangement. A terminating resistor 17 having an impedance value corresponding to the surge impedance of network 14 is connected across the output of the network 14 adjacent cathode follower 12 and between the grid of the cathode follower and ground at 7. It thus serves as grid-cathode resistor for that stage as well as to prevent the reflection of signals supplied by source 10 via limiter 13.

The output circuit of cathode follower 12 includes a cathode resistor 18 connected between the cathode of device 12 and a negative point of a source of unidirectional potential 19, the positive terminal of which is connected to the anode of device 12. An intermediate point in this source is grounded at 9. This source 19 thus supplies anode potential as well as cathode-bias potential for this tube. The cathode-end of resistor 18 is coupled through a coupling condenser 20 to the anode 21 of a diode rectifier 22 having a cathode 23. Diode 22 is connected in a peak-rectifying circuit which also includes an anode or input resistor 24 and a cathode or output resistor 25 for the diode in series with the diode. The rectifier circuit also includes a peak-charging condenser 26 connected in parallel with resistor 25.

A similar channel is coupled to source 11 and includes in cascade, and in the named order, an amplitude limiter 27, a phase delay network 28 and a cathode-follower tube 29. Network 28 includes series resistors 30 and condenser 31 connected in T form and terminating resistor 32 connected between the grid of device 29 and ground. Device 29 derives its anode and cathode-bias potentials from source 19, in the same way as does device 12, and is provided with a cathode resistor 33 coupled through a coupling condenser 34 to anode 35 of a diode rectifier 36 having a cathode 37 and which, for convenience, may be incorporated together with diode 22 in the same evacuated envelope. Diode 36 is in a peak-rectifying circuit similar to the one provided for diode 22, including an anode resistor 38, a cathode resistor 39 in series with the diode and a peak-charging condenser 40 connected across resistor 39. Cathode 37 is grounded and the rectifier output circuits are so connected that the difference between the rectified output signals is derived in an output circuit 41 which includes resistors 25 and 39 and condensers 26 and 40.

Resistors 39 and 25 are preferably of equal value, if the attenuation in the signal channel including cathode follower 12 and diode 22 is the same as that in the channel in which cathode follower 29 and diode 36 are included, so that the output signals are of equal absolute magnitude. However, if the amounts of attenuation in these channels are not equal, the values resistors 25 and 39 may be proportioned to provide equal output signal amplitudes, which condition is required for a symmetrical phase displacement versus output signal amplitude characteristic for the phase comparator.

In addition to the signal paths from sources 10 and 11 to rectifiers 22 and 36 through delay networks 14 and 28, direct signal paths are provided between source 10 and rectifier 36 and between source 11 and rectifier 22. More specifically, these direct signal paths include a first coupling and isolating resistor 42 having one of its extremities connected to one terminal of the output circuit of limiter 13 and the other connected to the grid-end of resistor 32. In a similar manner another coupling and isolating resistor 43 has one of its end-terminals connected to one terminal of the output circuit of limiter 27 and the other connected to the grid-end of resistor 17.

Suitable ground connections complete the individual, direct signal paths between limiter 13 and cathode follower 29 and between limiter 27 and cathode follower 12, these ground connections being indicated at 7, 8 and 9 on the drawing. Resistors 42 and 43 have equal resistance values, individually high compared with that of resistors 17 and 32 so that signals translated through each of networks 14 and 28 are not transferred through these resistors from the output side of one of the networks to the input side of the other.

The resistance values for resistors 15 and condenser 16 are selected, in a known manner, so that at the frequency of the signals supplied by source 10, a phase delay is imposed of something less than $\pi/2$ radians. Resistors 30 and condenser 31 are likewise chosen to provide a similar phase delay. Moreover, these constants are selected so that networks 14 and 28 have identical attenuation characteristics. In this example, it is assumed that the phase delays are approximately $\pi/12$ radians or 15°. It is thus apparent that networks 14 and 28, together with resistors 42 and 43 comprise a phasing network 44 for coupling a source (10 and 11) of a pair of signals having the same frequency and subject to variations in phase relative to one another, with the rectifiers 22 and 36. Phasing network 44 includes means for introducing a fixed phase displacement of less than $\pi/2$ radians, at the frequency of the signals from sources 10 and 11, between the signals as applied to each rectifier.

In order to make use of the rectified signal components from diodes 22 and 36, a utilization circuit 45 is coupled to output circuit 41 through an amplifier 46 in cascade with linearizing means 47. Linearizing means 47 is represented as including a resistor 48 connected in series relation in the coupling circuit between amplifier 46 and utilization circuit 45 and a fixed resistor 48' shunting the coupling circuit. Resistor 48 is of the type which exhibits a non-linear applied voltage versus resulting current characteristic, one example of which is identified by the trademark Thyrite. It may be generally stated that linearizing means 47 is included in the signal translating path comprising those elements interposed between sources 10 and 11 and utilization circuit 45. Its effect on the phase comparator circuit will be better understood from the discussion to follow.

Limiters 13 and 27 may be of any known construction for supplying to phasing network 44 signals of constant amplitude irrespective of amplitude variations in the signals applied to the limiters. Amplifier 46 also may be of conventional construction, having a sufficient range of operating frequencies to provide uniform amplification for the frequency components of the signal derived from rectifiers 22 and 36.

Utilization circuit 45 may take various forms; for example, in an application wherein source 10 represents a source of reference phase and source 11 is to be maintained in phase with source 10, circuit 45 may be a conventional reactance tube coupled in known fashion to source 11, thereby completing an automatic phase control circuit. In this application, the phase comparator in accordance with the present invention serves to provide an error signal in response to variations in phase between sources 10 and 11, and this error signal is employed to control the phase of source 11, thereby maintaining it in phase with source 10.

Another example in which an extremely linear phase displacement versus output signal amplitude characteristic is more important than in the just-described illustration is a system for demodulating a phase-modulated signal. In this case, source 10 again is a reference and source 11 represents incoming, phase-modulated signals. The modulation components of that signal are derived in output circuit 41, amplified in stage 46, and applied to utilization circuit 45 through element 47. If the modulation components are within the audio frequency range, utilization circuit 45 takes form of a loud speaker or the like.

In describing the operation of the phase comparator in accordance with the instant invention, reference is made to the graph of Fig. 2 which illustrates the voltages at various points in the circuit occurring for different amounts of phase displacement between the signals from sources 10 and 11, voltages being plotted as ordinates and phase displacements as abscissas. Considering first the signals as applied to diode rectifier 22, the undulating signal from source 10 is subjected to a phase delay of $\pi/12$ radians in phase-delay network 14 and this delayed signal is applied to the input circuit of cathode follower 12. The signal undulations from source 11 are applied through resistor 43 to that cathode follower, and the delayed and undelayed signals are vectorially added at resistor 17. The vector sum thereafter is applied after translation through stage 12 to the anode circuit of rectifier 22, the rectified components of this vector sum being derived in portion 25—26 of output circuit 41.

As the phase between the signals from sources 10 and 11 varies, the potential that is derived across condenser 26 varies sinusoidally between zero and a maximum value. This is represented in Fig. 2 by curve 49 which illustrates that the variation is of sinusoidal unidirectional character having minimum or zero values spaced in phase by $2\pi$ radians, and maximum values which occur midway between the zero points. Curve 49 may be derived algebraically, by vector addition, or by an empirical process.

In a similar manner the signal from source 11 is applied to the input circuit of cathode follower 29 after being subjected to a delay of $\pi/12$ radians in phasing network 28 and the signal from source 10 is applied, via resistor 42, with no phase delay. The potential developed across condenser 40 is represented in Fig. 2 by curve 50 which is identical to curve 49, but of opposite polarity, and has its zero points displaced in phase from those of curve 49 by $\pi/6$ radians.

Thus, the charges on condensers 26 and 40 vary in accordance with the phase difference between the signals of sources 10 and 11, from zero to respective positive and negative maximum values, shown by the polarity markings on the drawing adjacent these condensers. Condenser 26 is charged positively with respect to ground, whereas condenser 40 is charged negatively with respect to ground and since these condensers are effectively in series, the difference between their instantaneous potentials is applied to amplifier 46. This difference, theoretically, is that between the instantaneous values of curves 49 and 50, represented by dash-dot curve 51, in Fig. 2. Curve 51 exhibits portions having sharp transitions in slope which correspond in time-phase with the points of zero potential of curves 49 and 50; however, in practice such transitions are less pronounced and conform more to the curved dash-line extensions 52 of curve 51.

It may be observed that curve 51 includes a portion linear within five per cent for phase displacements between plus and minus $\pi/2$ radians. The usable range of the phase comparator extends beyond these limits and element 47 serves to maintain linearity as will presently be described. As pointed out hereinbefore, resistor 48 has a non-linear applied voltage versus resulting current characteristic and, in other words, its impedance varies with the amplitude of the applied voltage. Since the impedance of shunt resistor 48' remains constant, element 47 effectively introduces a decreasing amount of attenuation for increases in amplitude of the applied signal. The non-linearity of resistor 48 is selected to compensate for the curvature of characteristic 51, beyond plus and minus $\pi/2$ radians, and the resulting corrected phase displacement versus output signal amplitude characteristics is represented by dash-dot-dot curve 53. It will be observed that curve 53 has a linear region extending almost to plus and minus $3\pi/4$ radians.

Thus it may be seen that the improved phase comparator in accordance with the present invention has a linear operating range of phase displacement which is considerably greater than heretofore possible, and hence, its utility is materially increased.

From an inspection of Fig. 2, it may be seen that phase delay devices for providing delays other than some value less than $\pi/2$ may be suitably employed. For example, if instead of a delay of $\pi/12$ radians, networks 14 and 28 subject signals to a delay of $23\pi/12$ radians, curve 50 is effectively displaced in phase, to the right, relative to curve 49, by $5\pi/3$ radians, or in other words, the spacing between successive nulls of the curves is $\pi/6$ radians in a direction opposite to that of Fig. 2. With such a provision, the phase comparator operates just as described in connection with curves 49 and 50; however, curve 51 is of opposite polarity to that illustrated and is displaced to the left by $\pi/6$ radians. Various other amounts of phase delay may suggest themselves, and in general, are included in a range defined by any integral multiple, including zero, of $\pi$ radians plus or minus a quantity less than $\pi/2$ radians. Expressed another way, $$\phi = n\pi \pm \Delta$$

where $\phi$ is the phase delay in radians, $n$ is any integer including zero and $\Delta$ is a quantity less than $\pi/2$ radians. The amount of phase delay employed is a matter of choice; however, in order to minimize loss in the delay line, the most economical arrangement is one in which a phase delay of less than $\pi/2$ radians is employed, such as in the embodiment of Fig. 1.

Fig. 3 illustrates a modification of the invention which employs a single phase-delay network 60 coupled to various circuit elements which find their counterpart in Fig. 1 and are identified by the same reference numerals. Instead of being composed of sections which include resistors and capacitors, as employed in networks 14 and 28, network 60 comprises series inductors 61 and shunt capacitors 62 connected in a "$\pi$" arrangement. As is well known, such a network may be employed for higher operating frequencies than those illustrated in connection with the phase comparator of Fig. 1 and is designed to provide a phase delay of less than $\pi/2$ radians at the operating frequency in a known manner. Resistors 63 and 64 are connected to individual ends of network 60 and each has an impedance value equal to the surge impedance of the network, serving to present reflections of signal energy. A direct coupling circuit between limiter 13 and cathode follower 12 includes a conductor 65 and suitable ground connections and similarly a coupling circuit between limiter 27 and cathode follower 29 comprises a conductor 66 together with proper ground connections. One end of network 60 is bridged across the coupling circuit between limiter 13 and cathode follower 12 and the other end is bridged across the coupling circuit between limiter 27 and cathode follower 29.

It is apparent that the signal from source 10 is applied to cathode follower 12 without delay, whereas the signal from source 11 is applied to the same cathode follower after being subject to a delay within the network 60. In a like manner, the signal from source 11 is applied with no delay to cathode follower 29, and the signal from source 10 subjected to the delay of network 60 before application to that cathode follower.

The operation of this embodiment of the invention, thereafter, is the same as for the arrangement of Fig. 1, and the discussion presented in connection with the curves of Fig. 2 is applicable and need not be repeated.

Although resistance-capacitance and inductance-capacitance types of phase-delay networks have been illustrated, it is to be understood that various known types of elements for producing a phase delay may be utilized. For example, transmission line and wave guide elements could be suitably employed. The amount of phase delay in each case is less than $\pi/2$ radians and the particular value is selected in accordance with the circuit requirements.

In this connection, it should be pointed out that the linear portion of curve 53 in Fig. 2 varies in slope and extent with the amount of phase delay of the phasing network. Specifically, the slope is large at a phase delay of $\pi/2$ radians, but the usable phase-displacement range is limited to plus and minus $\pi/2$ radians. As the phase delay is decreased, the slope of the linear curve portion decreases and the range increases. For example, an analysis of two conditions has shown that the useful range is something better than plus and minus $11\pi/12$ radians for a phase delay of $\pi/12$ radians, as compared with a range plus and minus $3\pi/4$ radians for a phase delay of $\pi/4$ radians. However the slope of the characteristic curve is one-third smaller in the case of the lesser phase delay.

Although the phase delays imposed on the signals supplied to each of cathode followers 12 and 29 usually are the same, experiment has shown that unequal delays may be employed without seriously impairing the efficiency of the phase comparator. For example, with reference to Fig. 1, if network 28 is constructed to provide a phase delay of $\pi/24$ radians instead of $\pi/12$ radians, curve 51 of Fig. 2 becomes slightly unsymmetrical, but the extent of its linearity and range would not change more than a few per cent.

Referring now to Fig. 4, there is illustrated another form of linearizing means which may be employed in place of element 47 in the circuit of Fig. 1. The modified arrangement includes a non-linear or Thyrite resistor element 70 in series with the coupling circuit between amplifier 46 and utilization circuit 45 and a shunt resistor 71 having a fixed impedance. One group of rectifiers 72, connected in series and in the same polarity sense, is connected to resistors 70 through a bias source 73. Source 73 is poled so that diodes 72 are non-conductive for signals of an amplitude below that of the potential of source 73. Another group of series rectifiers 74 and a bias source 75 is also connected across resistors 70, but in a polarity sense opposite to that of elements 72—73. Rectifiers 72 and 74, for example, may be of the germanium type which are essentially unidirectionally conductive. Moreover, these rectifiers exhibit an applied voltage versus resulting current characteristic which is non-linear and yet is different from that of Thyrite resistor 70.

In describing the operation of the linearizing means of Fig. 4, attention is directed to Fig. 5 which illustrates, in terms of input voltages plotted as abscissas and output voltages plotted as ordinates, the operating characteristic for the circuit. Consider the effect of resistor 70 alone, it functions in the same manner as resistor 48 in the linearizer of Fig. 1, and the resulting characteristic curve is represented by dash line 76. However, for amplitudes greater than the potential supplied by bias sources 73 and 75, rectifiers 72 and 74 come into action; that is to say, at points 77 and 78 along curve 76, resistor 70 is shunted by rectifiers 72 and 74, and the resulting characteristic curve is much steeper, being represented by the solid lines 79 and 80. In applying curve 76—80 to correct the non-linearity of curve 5 in Fig. 2, portions 79 and 80 of the correction curve should occur in the vicinity of the rounded-off sections 52 of curve 51. In other words, a greater degree of correction is required as the shape of curve 51 departs more and more from linearity. The departure is more rapid at the greater phase displacements, and this is where linearizing-curve sections 79 and 80 come into operation. In this manner the linearity of the phase comparator characteristic curve may be maintained for substantially its entire operating range.

Fig. 6 illustrates another form of linearizing circuit which may be interposed between amplifier 46 and utilization circuit 45 of Fig. 1. It includes a first cathode follower 85 having its cathode impedance 86 coupled through a condenser 87 and a series resistor 88 to the grid circuit of another cathode follower 89. A Thyrite resistor 90 shunts series resistor 88, and cathode follower 89 is provided with a grid resistor 91 and a cathode resistor 92 which is coupled through a coupling condenser 93 and a series resistor 94 to a shunt resistor 95. The terminals of resistors 86 and 92, remote from the cathodes, are connected to the negative terminal of the source of potential 19, an intermediate point of which is grounded. Another Thyrite resistor 96 is connected in parallel with series resistor 94.

In operation, each of the portions of the circuit having one of the Thyrite resistors 90 and 96 exhibits an output voltage versus input voltage represented by curve 76 of Fig. 5. Since cathode follower 89 effectively couples the circuits in cascade, the characteristics are multiplied. Stated another way, the output voltage amplitude versus input voltage amplitude characteristic for the entire circuit of Fig. 6 is of materially greater curvature beyond points 77 and 78 of curve 76. For example, if curve 76 may be expressed by an equation having one term with an exponent of two, the resulting curve has a term with an exponent of four. Thus, the circuit of Fig. 6 may be employed for effectively linearizing curve 51 of Fig. 2.

While particular embodiments of the present invention have been described, it will be obvious to those skilled in the art that various changes and modifications may be made therein without departing from my invention, and it is, therefore, intended in the appended claims to cover all such changes and modifications as fall within the true spirit and scope of my invention.

What I claim as new and desire to secure by Letters Patent of the United States is:

1. A phase comparator responsive to the phase relation between two electromotive forces of the same frequency and subject to variations in phase relative to one another including a pair of rectifiers, a pair of phasing networks coupled to said rectifiers for supplying said electromotive forces thereto and having means for introducing a fixed phase displacement of less than $\pi/2$ radians at said frequency between said electromotive forces as applied to each of said rectifiers, crossover connector means for applying each of said electromotive forces to a rectifier without undergoing appreciable phase shift, an output circuit including series-connected reactive elements for combining the rectified components of the electromotive forces applied to said rectifiers normally to derive a substantially linear characteristic relating the instantaneous amplitude values of the output electromotive force and said variations in phase, a utilization circuit coupled to said output circuit, and resistive network means including a non-linear element interposed between said output circuit and said utilization circuit adapted to improve the linearity of said characteristic.

2. A phase comparator responsive to the phase relation between first and second electromotive forces of the same frequency and subject to variations in phase relative to one another including first and second rectifiers, a pair of phase-delay networks, one coupled to said first rectifier for supplying said first electromotive force thereto and the other coupled to said second rectifier for supplying said second electromotive force thereto, said networks having essentially identical phase-delay characteristics, individually equal to less than $\pi/2$ radians at said frequency and having substantially equal attenuation for electromotive forces at said frequency, means for supplying said first electromotive force directly to said second rectifier, means for supplying said second electromotive force directly to said first rectifier, an output circuit including series-connected reactive elements for combining the rectified components of the electromotive forces applied to said rectifiers to derive an output voltage having instantaneous amplitude values corresponding to said variations in phase, a utilization circuit coupled to said output circuit, and linearizing means including a non-linear element interposed between said output circuit and said utilization circuit.

3. A phase comparator responsive to the phase relation between first and second electromotive forces of the same frequency and subject to variations in phase relative to one another including first and second rectifiers, connector means for supplying said first electromotive force directly to said second rectifier, connector means for supplying said second electromotive force directly to said first rectifier, a pair of coupling circuits, one coupled to said first rectifier for supplying said first electromotive force thereto and the other coupled to said second rectifier for supplying said second electromotive force thereto, phase-delay means coupled to each of said coupling circuits for introducing a fixed phase displacement of less than $\pi/2$ radians at said frequency between said electromotive forces as applied to each of said rectifiers normally to derive a substantially linear characteristic relating the instantaneous amplitude values of the output voltage and said variations in phase, an output circuit for said rectifiers including series-connected reactive elements, a utilization circuit coupled to said output circuit, and means including a non-linear element interposed between said output circuit and said utilization circuit to effect extension of said linear characteristics over a wider range of variations in phase.

4. A phase comparator responsive to the phase relation between first and second electromotive forces of the same frequency and subject to variations in phase relative to one another including first and second rectifiers, a pair of coupling circuits, one coupled to said first rectifier for supplying said first electromotive force thereto and the other coupled to said second rectifier for supplying said second electromotive force thereto, a phase-delay network having a given surge impedance value and comprising one end portion coupled to one of said coupling circuits and another end portion coupled to the other of said coupling circuits and having a phase-delay characteristic of less than $\pi/2$ radians at said frequency, said end portions being terminated by an impedance having a value substantially equal to said value of said surge impedance, an output circuit including series-connected reactive elements for combining the rectified components of the electromotive forces applied to said rectifiers to derive an output voltage having instantaneous amplitude values corresponding to said variations in phase, a utilization circuit coupled to said output circuit and linearizing means including a non-linear element interposed between said output circuit and said utilization circuit.

5. A phase comparator responsive to the phase relation between two electromotive forces of the same frequency and subject to variations in phase relative to one another including a pair of rectifiers, a pair of phasing networks coupled to said rectifiers for supplying said electromotive forces respectively thereto and having means for introducing a fixed phase displacement of less than $\pi/2$ radians at said frequency between said respective electromotive forces as applied to each of said rectifiers, crossover connector means for supplying each of said electromotive forces to a rectifier without undergoing appreciable phase shift, an output circuit including series-connected reactive elements for combining the rectified components of the electromotive forces applied to said rectifiers to derive a variable polarity output voltage having instantaneous amplitude values normally linearly related to said variations in phase over a predetermined range of phase variations, and means including a resistive element having a non-linear input signal amplitude versus output signal amplitude characteristic coupled to said output circuit for extending said linear relation.

6. A phase comparator responsive to the phase relation between two electromotive forces of the same frequency and subject to variations in phase relative to one another including a pair of rectifiers, a phasing network coupled to each of said rectifiers for supplying said electromotive forces respectively thereto and having network means for introducing a fixed phase displacement of less than $\pi/2$ radians at said frequency between said electromotive forces as applied to each of said respective rectifiers, crossover connector means for supplying each of said electromotive forces to a rectifier without undergoing appreciable phase shift, an output circuit including series-connected reactive elements for combining the rectified components of the electromotive forces applied to said rectifiers to derive an output voltage having instantaneous amplitude values corresponding to said variations in phase, a utilization circuit coupled to said output circuit, and linearizing means interposed between said output circuit and said utilization circuit and including a pair of elements having non-linear input signal amplitude versus output signal amplitude characteristics.

7. A phase comparator responsive to the phase relation between two electromotive forces of the same frequency and subject to variations in phase relative to one another including a pair of rectifiers, a phasing network coupled to each of said rectifiers for supplying said electromotive forces respectively thereto and having means for introducing a fixed phase displacement of less than $\pi/2$ radians at said frequency between said respective electromotive forces as applied to each of said rectifiers, crossover connector means for supplying each of said electromotive forces to a rectifier without undergoing appreciable phase shift, an output circuit including series-connected reactive elements for combining the rectified components of the electromotive forces applied to said rectifiers to derive an output voltage having instantaneous amplitude values corresponding to said variations in phase, a utilization circuit coupled to said output circuit, and linearizing means interposed between said output circuit and said utilization circuit and including a pair of tube elements having individual non-linear input signal amplitude versus output signal amplitude characteristics coupled in cascade relation.

8. In a system including means supplying a pair of undulating potentials having the same frequency and subject to variations in phase relative to one another, a phase comparator including a pair of rectifiers, a pair of phasing networks coupling said supplying means to said rectifiers and having network means for introducing a fixed phase displacement of less than $\pi/2$ radians at said frequency between said undulating potentials as applied respectively to each of said rectifiers, crossover connector means for supplying each of said undulating potentials to a rectifier without undergoing appreciable phase shift, an output circuit including series-connected reactive elements for combining the rectified components of the undulating potentials applied to said rectifiers to derive an output potential having instantaneous amplitude values corresponding to said variations in phase, and a utilization circuit coupled to said output circuit.

9. In a system including means supplying a pair of undulating potentials having the same frequency and subject to variations in phase relative to one another, a phase comparator including a pair of rectifiers, a pair of phasing networks coupling said supplying means to said rectifiers and having network means for introducing a fixed phase displacement, having a value equal to an integral multiple, including zero, of radians plus or minus a quantity less than $\pi/2$ radians, at said frequency between said undulating potentials as applied respectively to each of said rectifiers, crossover connector means for supplying each of said undulating potentials to a rectifier without undergoing appreciable phase shift, an output circuit including series-connected reactive elements for combining the rectified components of the undulating potentials applied to said rectifiers to derive an output potential having instantaneous amplitude values corresponding to said variations in phase, and a utilization circuit coupled to said output circuit.

10. In a system including means supplying a pair of undulating potentials having the same frequency and subject to variations in phase relative to one another, a phase comparator including a pair of rectifiers, a pair of phasing networks coupling said supplying means to said rectifiers and having network means for introducing a fixed phase displacement, having a value equal to an integral multiple, including zero, of $\pi$ radians plus or minus a quantity less than $\pi/2$ radians, at said frequency between said undulating potentials as applied respectively to each of said rectifiers, crossover connector means for supplying each of said undulating potentials to a rectifier without undergoing appreciable phase shift, an output circuit including series-connected reactive elements for combining the rectified components of the undulating potentials applied to said rectifiers to derive an output potential having instantaneous amplitude values linearly related to said variations in phase over a predetermined range of phase variations, a utilization circuit coupled to said output circuit, and resistive means of a non-linear character included between said output circuit and said utilization circuit in order to extend said linear relation over a wide range of phase variations.

11. A phase comparator responsive to the phase relation between first and second electromotive forces of the same frequency and subject to variations in phase relative to one another, comprising first and second rectifiers, phase delay network means including capacitance and having a pair of output terminals, one terminal being coupled through a cathode follower circuit to said first rectifier for supplying thereto by means of electrical addition in a grounded resistor a voltage corresponding to the sum of said second electromotive force and a phase-shifted version of said first electromotive force, and the other terminal being coupled through a second cathode follower circuit to said second rectifier for supplying thereto by means of electrical addition in a second grounded resistor a voltage corresponding to the sum of said first electromotive force and a phase-shifted version of said second electromotive force, said phase-delay network means having a phase-delay characteristic of less than $\pi/2$ radians at said frequency, an output circuit including series-connected reactive elements for combining the rectified components of the electromotive forces applied to said rectifiers, and non-linear resistive network means coupled to said output circuit for extending the linearity of the relationship between the instantaneous amplitude values of the output voltage and said variations in phase over an increased range of phase variations.

12. In a phase-comparing system, first and second signal channels, first and second rectifying means, means for establishing a substantially phase-shift-free linkage between said first signal channel and said first rectifying means, means for establishing a phase-shifting linkage between said second signal channel and said first rectifying means, means for establishing a substantially phase-shift-free linkage between said second signal channel and said second rectifying means, means for establishing a phase-shifting linkage between said first signal channel and said second rectifying means, and means jointly responsive to the outputs of said rectifying means.

13. In a phase-comparing system, first and second signal channels, first and second rectifying means, means for establishing a substantially phase-shift-free linkage between said first signal channel and said first rectifying means, means for establishing a phase-shifting linkage between said second signal channel and said first rectifying means, means for establishing a substantially phase-shift-free linkage between said second signal channel and said second rectifying means, means for establishing a phase-shifting linkage between said first signal channel and said second rectifying means, and means jointly responsive to the opposed outputs of said rectifying means.

References Cited in the file of this patent

UNITED STATES PATENTS

| | | |
|---|---|---|
| 2,405,073 | Troell | July 30, 1946 |
| 2,411,876 | Hansen | Dec. 3, 1946 |
| 2,431,306 | Chatterjea et al. | Nov. 25, 1947 |
| 2,476,329 | Sitzer | July 19, 1949 |
| 2,517,586 | Moe | Aug. 8, 1950 |
| 2,535,666 | Broding | Dec. 26, 1950 |
| 2,557,900 | Wallace et al. | June 19, 1951 |
| 2,568,250 | O'Brien | Sept. 18, 1951 |
| 2,595,263 | Ingalls | May 6, 1952 |